US 12,163,545 B2

(12) United States Patent
Iwama

(10) Patent No.: US 12,163,545 B2
(45) Date of Patent: Dec. 10, 2024

(54) WIRE GRIPPER AND ATTACHMENT STRUCTURE FOR ATTACHING SWING MEMBER TO FIRST MEMBER OF OPERATION TOOL

(71) Applicant: NAGAKI SEIKI CO., LTD., Osaka (JP)

(72) Inventor: Tamotsu Iwama, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 792 days.

(21) Appl. No.: 17/312,671

(22) PCT Filed: Nov. 1, 2019

(86) PCT No.: PCT/JP2019/042993
§ 371 (c)(1),
(2) Date: Jun. 10, 2021

(87) PCT Pub. No.: WO2020/121682
PCT Pub. Date: Jun. 18, 2020

(65) Prior Publication Data
US 2022/0065275 A1 Mar. 3, 2022

(30) Foreign Application Priority Data
Dec. 11, 2018 (JP) ................. 2018-231412

(51) Int. Cl.
*F16B 2/00* (2006.01)
*F16B 2/18* (2006.01)
*H02G 1/04* (2006.01)

(52) U.S. Cl.
CPC ............... *F16B 2/185* (2013.01); *H02G 1/04* (2013.01)

(58) Field of Classification Search
CPC .......... F16B 2/185; F16B 21/00; F16B 21/18; H02G 1/04
See application file for complete search history.

(56) References Cited

U.S. PATENT DOCUMENTS 3,059,955 A * 10/1962 Thurston .................. H02G 1/04
294/174
10,439,374 B2 10/2019 Nagaki et al.
(Continued)

FOREIGN PATENT DOCUMENTS

CN 106165223 A 11/2016
GB 1592827 A * 7/1981 ............. B25B 1/241
(Continued)

OTHER PUBLICATIONS

Written Opionion dated Dec. 17, 2019 in PCT/JP2019/042993, 6 pages.
(Continued)

Primary Examiner — Emmanuel M Marcelo
(74) Attorney, Agent, or Firm — MUNCY, GEISSLER, OLDS & LOWE, P.C.

(57) ABSTRACT

The object is to provide an attachment structure that is for attaching a swing member to a first member of an operation tool and can withstand a high load acting on the swing member and to provide a wire gripper having the attachment structure. The attachment structure for attaching a swing member to a first member of an operation tool includes: the first member having a first through hole; the swing member having a second through hole; a first pin member having a shaft portion inserted through the first through hole and the second through hole; a reinforcement member that prevents the first member and the swing member from coming out of the first pin member and supports at least a part of a bending load or a torsional load received by the swing member; and a fixing member that fixes the reinforcement member to the
(Continued)

first pin member. A fitting groove is provided in an outer circumference surface of the shaft portion of the first pin member. The reinforcement member includes an insertion portion inserted in the fitting groove and a retaining portion protruding out of the fitting groove. The fixing member fixes the reinforcement member to the first pin member with the reinforcement member being fit into the first pin member.

18 Claims, 7 Drawing Sheets

(56) References Cited

U.S. PATENT DOCUMENTS

| | | | |
|---|---|---|---|
| 2016/0336724 A1* | 11/2016 | Nagaki | H02G 1/06 |
| 2018/0031794 A1* | 2/2018 | Sakmar | G02B 6/48 |
| 2018/0212407 A1 | 7/2018 | Nagaki et al. | |

FOREIGN PATENT DOCUMENTS

| | | | | |
|---|---|---|---|---|
| GB | 2537342 A | * | 10/2016 | G01L 1/22 |
| JP | S-6119013 A | | 1/1986 | |
| JP | H9189314 A | | 7/1997 | |
| JP | H-09189314 A | | 7/1997 | |
| KR | 20-1993-0025962 U | | 12/1993 | |
| KR | 20-0395423 Y1 | | 8/2005 | |
| KR | 10-2018-0100739 A | | 9/2018 | |
| TW | 201733230 A | | 9/2017 | |
| WO | WO2017/119149 A1 | | 7/2017 | |
| WO | WO-2017119148 A1 | * | 7/2017 | A62B 1/14 |
| WO | WO-2022102562 A1 | * | 5/2022 | |

OTHER PUBLICATIONS

Office action mailed Jan. 4, 2022 in counterpart JP Application 2020-559806, with English translation, 6 pages.
Written Opinion mailed Dec. 17, 2019 in PCT/JP2019/042990, 7 pages.

* cited by examiner

WIRE GRIPPER AND ATTACHMENT STRUCTURE FOR ATTACHING SWING MEMBER TO FIRST MEMBER OF OPERATION TOOL

TECHNICAL FIELD

The present invention relates to a wire gripper and an attachment structure for attaching a swing member to a first member of an operation tool.

BACKGROUND ART

Wire grippers that can grip a linear material such as an electric wire are known. For example, a wire gripper is used for pulling an electric wire in order to form a slack part or the like in the electric wire.

As a related art, Patent Literature 1 discloses a wire gripper. In the wire gripper disclosed in Patent Literature 1, a linear material such as an electric wire is gripped by a linear material pressing portion provided to a fixed grasping member and a linear material holding portion provided to a mobile grasping member connected to an activation member. Patent Literature 1 discloses that substantially a triangular activation member and a lever member provided with a pull hole to hang a hook or the like are connected to each other rotatably via a lever member revolving shaft.

CITATION LIST

Patent Literature

Patent Literature 1: International Publication No. 2017/119149

SUMMARY OF INVENTION

Technical Problem

In general, when a wire gripper maintains tension of a hung electric wire under construction, excessively large force is applied to components forming the wire gripper. The object of the present invention is to provide an attachment structure that is for attaching a swing member to a first member of an operation tool and can withstand a high load acting on the swing member and to provide a wire gripper having the attachment structure.

Solution to Problem

The present invention relates to a wire gripper and an attachment structure for attaching a swing member to a first member of an operation tool illustrated below.
(1) An attachment structure for attaching a swing member to a first member of an operation tool, the attachment structure comprising:
  the first member having a first through hole;
  the swing member having a second through hole;
  a first pin member having a shaft portion inserted through the first through hole and the second through hole;
  a reinforcement member that prevents the first member and the swing member from coming out of the first pin member and supports at least a part of a bending load or a torsional load received by the swing member; and
  a fixing member that fixes the reinforcement member to the first pin member,
  wherein a fitting groove is provided in an outer circumference surface of the shaft portion of the first pin member,
  wherein the reinforcement member comprises an insertion portion inserted in the fitting groove and a retaining portion protruding out of the fitting groove, and
  wherein the fixing member fixes the reinforcement member to the first pin member with the reinforcement member being fit into the first pin member.
(2) The attachment structure according to (1) above,
  wherein the fixing member is a second pin member,
  wherein a first hole in which a part of the second pin member is inserted is formed in the shaft portion, and
  wherein a second hole in which another part of the second pin member is inserted is formed in the reinforcement member.
(3) The attachment structure according to (2) above,
  wherein the shaft portion comprises
  a tip portion arranged on a tip side of the fitting groove,
  a base end portion arranged on a base end side of the fitting groove, and
  a connecting portion that connects the tip portion and the base end portion,
  wherein the second pin member is arranged across the tip portion and the base end portion.
(4) The attachment structure according to (3) above, wherein the tip portion of the shaft portion and the base end portion of the shaft portion are connected to each other by the connecting portion and the second pin member.
(5) The attachment structure according to (4) above,
  wherein the center axis of the second pin member is arranged on one side of a plane along the center axis of the first pin member, and
  wherein the center axis of the connecting portion is arranged on the other side of the plane.
(6) The attachment structure according to any one of (1) to (5) above, further comprising:
  a lever member connected to the swing member in a swingable manner; and
  a third pin member inserted through the swing member and the lever member,
  wherein the reinforcement member is arranged across the first pin member and the third pin member.
(7) A wire gripper comprising the attachment structure according to any one of (1) to (5) above.
(8) A wire gripper comprising the attachment structure according to (6) above.

Advantageous Effect of Invention

According to the present invention, it is possible to provide an attachment structure that is for attaching a swing member to a first member of an operation tool and can withstand a high load acting on the swing member and to provide a wire gripper having the attachment structure.

DESCRIPTION OF EMBODIMENTS

A wire gripper 1 and an attachment structure for attaching a swing member 20 to a first member of an operation tool in the embodiments will be described in detail below with reference to the drawings. Note that, in the present specification, members having the same type of function are labeled with the same or similar references. Further, for the members labeled with the same or similar references, duplicated description may be omitted.

In the following description, an example of a case where the "operation tool" corresponds to the wire gripper 1, and the "first member of the operation tool" corresponds to a wire gripper body 10 will be described. However, the "operation tool" may be a tool other than the wire gripper 1 (for example, tongs having an opening/closing mechanism at the end thereof, a cutting tool, or the like), and the "first member of the operation tool" may be a member other than the wire gripper body 10. In such a case, in the following description, the wire gripper is replaced with the "operation tool", and the wire gripper body is replaced with the "first member of the operation tool".

First Embodiment

Figure 1:
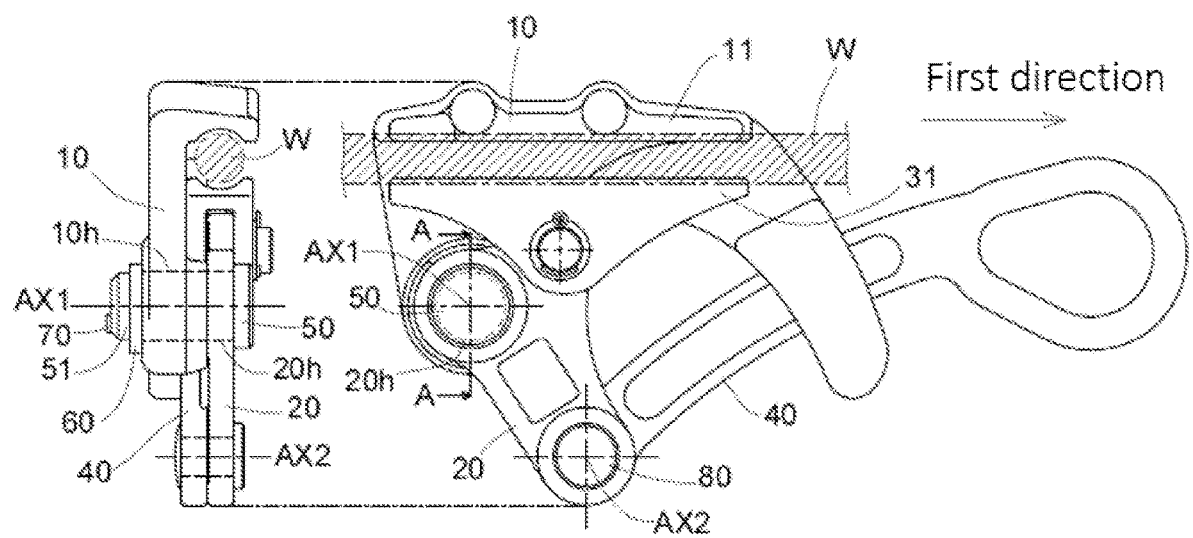
FIG. 1 is a schematic two-side view of a wire gripper in a first embodiment.
Figure 2:
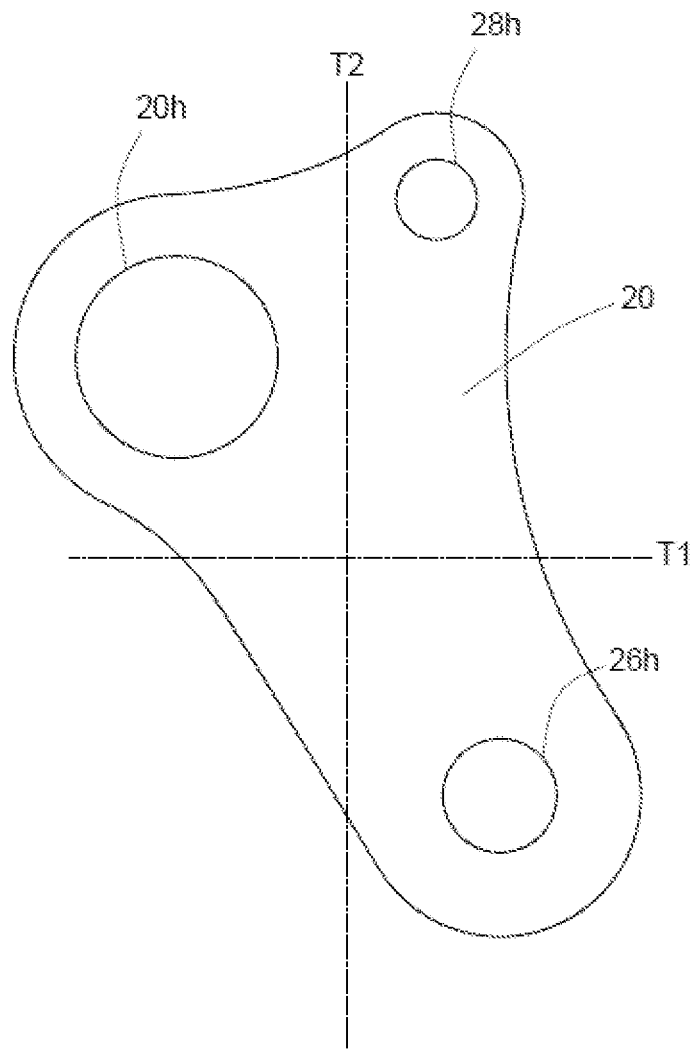
FIG. 2 is a schematic diagram illustrating a bending load and a torsional load acting on a swing member.
Figure 3:
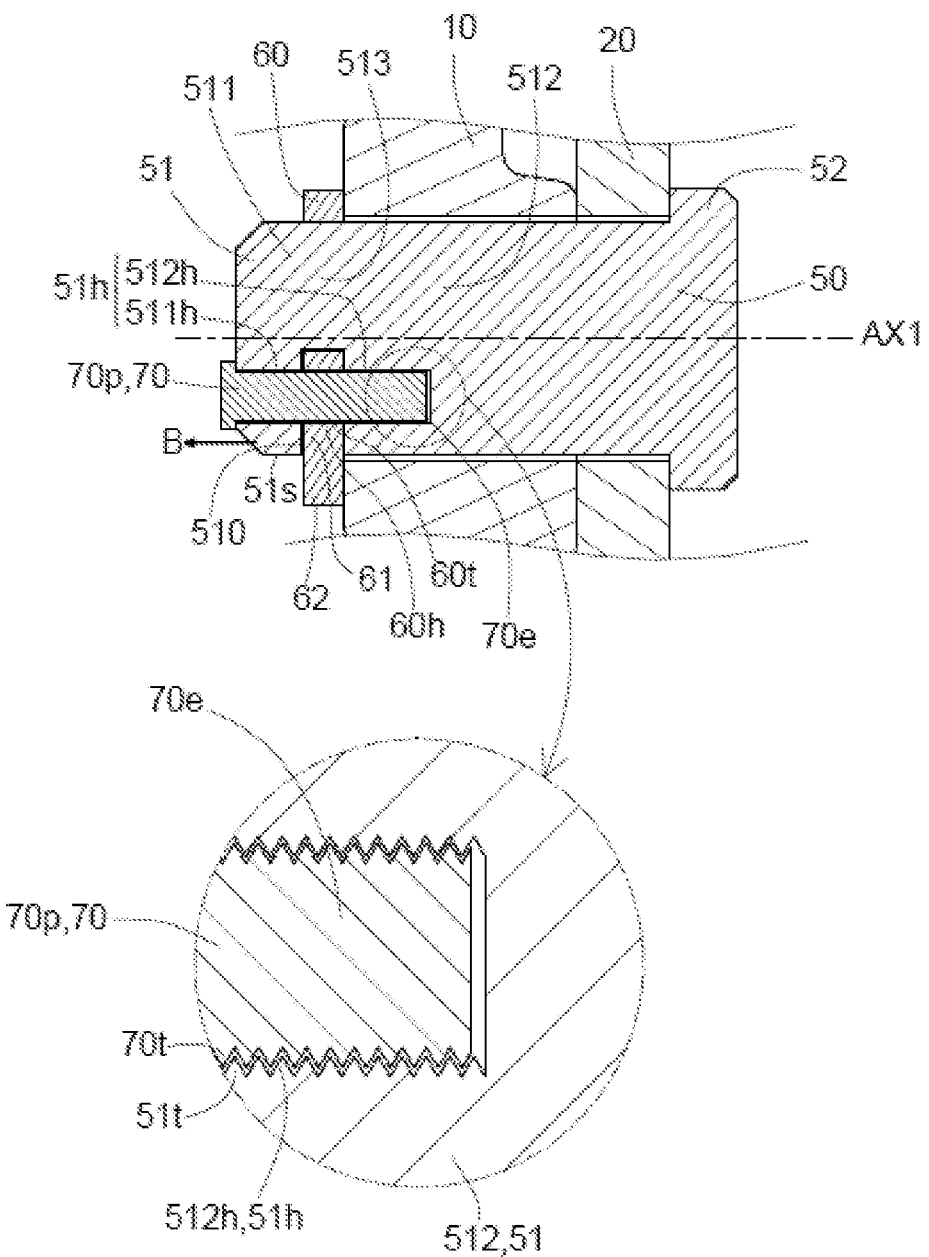
FIG. 3 is a sectional view of FIG. 1 when viewed from an arrow A-A.
Figure 4:
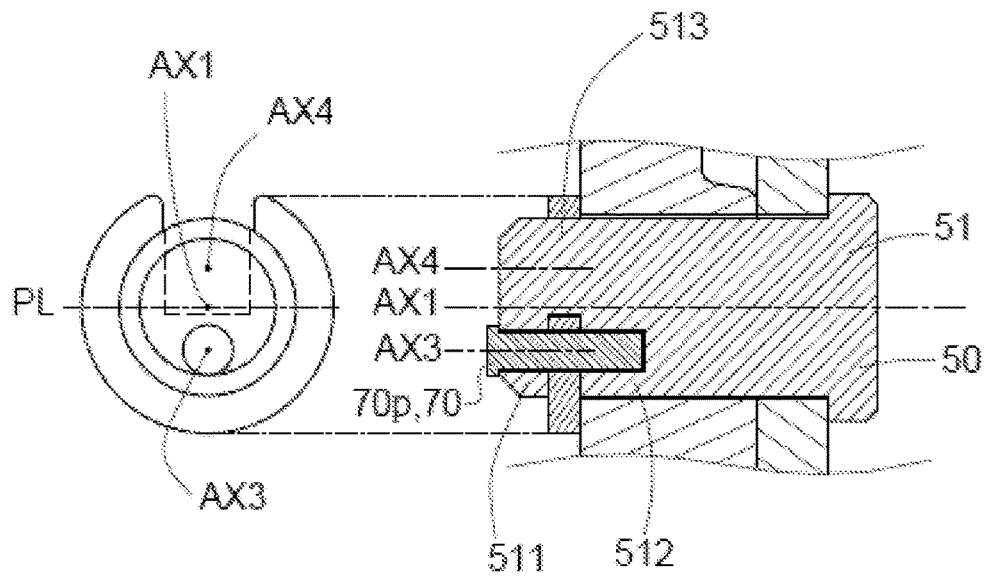
FIG. 4 is a schematic two-side view schematically illustrating an arrangement relationship of a center axis AX1 of a first pin member, a center axis AX3 of a second pin member, and a center axis AX4 of a connecting portion.

A wire gripper 1A in a first embodiment will be described with reference to FIG. 1 to FIG. 4. FIG. 1 is a schematic two-side view of a wire gripper 1A in the first embodiment. The right side in FIG. 1 illustrates a schematic front view of the wire gripper 1A, and the left side in FIG. 1 illustrates a schematic side view of the wire gripper 1A. FIG. 2 is a schematic diagram illustrating a bending load and a torsional load acting on the swing member 20. FIG. 3 is a sectional view of FIG. 1 when viewed from the arrow A-A. FIG. 4 is a schematic two-side view schematically illustrating an arrangement relationship of a center axis (AX1) of a first pin member 50, a center axis AX3 of a second pin member 70p, and a center axis AX4 of a connecting portion 513. The right side in FIG. 4 illustrates a sectional view, and the left side in FIG. 4 illustrates a front view.

The wire gripper 1A in the first embodiment has a wire gripper body 10, a swing member 20, a first pin member 50, a reinforcement member 60, and a fixing member 70. The wire gripper 1A may have the lever member 40.

The wire gripper body 10 (the first member of the operation tool) may be formed of a single member or may be formed in combination of a plurality of members. The wire gripper body 10 is provided with a first through hole 10h through which a shaft portion 51 of the first pin member 50 is inserted.

The swing member 20 is connected to the wire gripper body 10 in a swingable manner. Further, the swing member 20 is swingable about the first swing axis AX1 with respect to the wire gripper body 10. The swing member 20 is provided with a second through hole 20h through which the shaft portion 51 of the first pin member 50 is inserted.

The lever member 40 is connected to the swing member 20 in a swingable manner. Further, the lever member 40 is swingable about the second swing axis AX2 with respect to the swing member 20.

The first pin member 50 has the shaft portion 51 inserted through the wire gripper body 10 (more specifically, the first through hole 10h) and the swing member 20 (more specifically, the second through hole 20h). The shaft portion 51 extends along the first swing axis AX1.

As illustrated in FIG. 1, when the lever member 40 is pulled in the first direction (more specifically, a direction substantially parallel to the extending direction of the electric wire W), the swing member 20 connected to the lever member 40 swings about the first swing axis AX1. In response to swinging of the swing member 20, a second gripping piece 31 moves in a direction of approaching the first gripping piece 11, and as a result, the electric wire W is gripped by the first gripping piece 11 and the second gripping piece 31.

In the example illustrated in FIG. 1, when the lever member 40 is pulled in the first direction, a bending load (for example, a bending load around an axial line T1 of FIG. 2) and/or a torsional load (for example, a torsional load around an axial line T2 of FIG. 2) will act on the swing member 20 in addition to a tensile load. An increase in the bending load or the torsional load may cause damage or breakage of the swing member 20.

Accordingly, the wire gripper 1A in the first embodiment has the reinforcement member 60 that supports at least a part of a bending load or a torsional load received by the swing member 20 (see FIG. 1) and a fixing member 70 that fixes the reinforcement member 60 to the first pin member 50. When the swing member 20 is subjected to bending deformation and/or torsional deformation, the swing member 20 directly or indirectly presses the reinforcement member 60 in a direction along the first swing axis AX1. The reinforcement member 60 applies reaction force directly or indirectly to the swing member 20 against the pressing. In such a way, at least a part of the bending load or the torsional load applied to the swing member 20 is supported by the reinforcement member 60.

Further, the reinforcement member 60 functions as a retaining member that prevents the wire gripper body 10 and the swing member 20 from coming out of the first pin member 50.

The mechanism that the reinforcement member 60 functions as a retaining member will be described. As illustrated in FIG. 3, a fitting groove 510 that accepts an insertion portion 61 of the reinforcement member 60 is provided in the outer circumference surface 51s of the shaft portion 51 of the first pin member 50. Further, the reinforcement member 60 has a retaining portion 62 protruding out of the fitting groove 510 in addition to the insertion portion 61 to be inserted in the fitting groove 510. The retaining portion 62 directly or indirectly comes into contact with the wire gripper body 10 and/or the swing member 20 and thereby functions as a stopper that prevents the wire gripper body 10 and/or the swing member 20 from falling out of the first pin member 50. In the example illustrated in FIG. 3, since the wire gripper body 10 and the swing member 20 are interposed between a head portion 52 of the first pin member 50 and the reinforcement member 60 fixed to the first pin member 50, the wire gripper body 10 and/or the swing member 20 will not fall out of the first pin member 50.

As illustrated in FIG. 3, the fixing member 70 fixes the reinforcement member 60 to the first pin member 50 with the reinforcement member 60 being fit into the first pin member 50. Since the reinforcement member 60 is fixed to the first pin member 50 by the fixing member 70, the reinforcement member 60 will not unintendedly fall out of the first pin member 50.

An example of the structure of the fixing member 70, the first pin member 50, and the reinforcement member 60 will be specifically described with reference to FIG. 3.

The fixing member 70 is the second pin member 70p. A part of the second pin member 70p is inserted in a first hole 51h provided in the shaft portion 51, and another part of the second pin member 70p is inserted in a second hole 60h provided in the reinforcement member 60. Such insertion of the second pin member 70p in the first hole 51h and the second hole 60h prevents the reinforcement member 60 from moving in a direction perpendicular to the first swing axis AX1 and prevents the reinforcement member 60 from falling out of the first pin member 50. Note that, in the example illustrated in FIG. 3, the center axis of the first hole 51h is parallel to the first swing axis AX1, and the center axis of the second hole 60h is parallel to the first swing axis AX1.

In the example illustrated in FIG. 3, the shaft portion 51 has a tip portion 511, a base end portion 512, and a connecting portion 513. The tip portion 511 is a portion arranged on the tip side of the fitting groove 510 in the shaft portion 51, and the base end portion 512 is a portion arranged on the base end side of the fitting groove 510 in the shaft portion 51. Further, the connecting portion 513 is a portion connecting the tip portion 511 and the base end portion 512 to each other. The connecting portion 513 has a smaller sectional area (the sectional area on a plane perpendicular to the first swing axis AX1) than the tip portion 511 and the base end portion 512 because of the presence of the fitting groove 510.

In the example illustrated in FIG. 3, the first hole 51h formed in the shaft portion 51 includes a tip-side hole 511h formed in the tip portion 511 and a base-end-side hole 512h formed in the base end portion 512. Note that the tip-side hole 511h and the base-end-side hole 512h are holes coaxial to each other.

The second pin member 70p is arranged across the tip portion 511 (more specifically, the tip-side hole 511h) and the base end portion 512 (more specifically, the base-end-side hole 512h) and arranged so as to penetrate through the second hole 60h of the reinforcement member 60. In such a case, motion of the reinforcement member 60 (motion in the direction perpendicular to the first swing axis AX1) is restricted by the second pin member 70p supported by both the tip portion 511 and the base end portion 512. Therefore, the reinforcement member 60 is reliably prevented from moving in the direction perpendicular to the first swing axis AX1, and the reinforcement member 60 is more reliably prevented from falling out of the first pin member 50.

Further, in the example illustrated in FIG. 3, the tip portion 511 of the shaft portion 51 and the base end portion 512 of the shaft portion 51 are connected to each other by both the connecting portion 513 and the second pin member 70p. Thus, a load acting on the tip portion 511 of the shaft portion 51 (more specifically, a load in the direction along the first swing axis AX1 (the load indicated by the arrow B)) is transferred to the base end portion 512 of the shaft portion 51 via the connecting portion 513 and the second pin member 70p. Thus, deformation and damage of the tip portion 511 are suppressed even when a relatively large load acts on the tip portion 511 of the shaft portion 51. For example, when a bending load or a torsional load acts on the swing member 20, the tip portion 511 is pressed in the direction away from the base end portion 512 by the reinforcement member 60. In the example illustrated in FIG. 3, however, the load acting on the tip portion 511 is transferred to the base end portion 512 of the shaft portion 51 via the connecting portion 513 and the second pin member 70p, and therefore the tip portion 511 will not be significantly deformed.

In the example illustrated in FIG. 4, the center axis AX3 of the second pin member 70p is arranged eccentrically from the center axis (AX1) of the first pin member 50, and the center axis AX4 of the connecting portion 513 (the axis passing through the center of the sectional area of the connecting portion 513) is arranged eccentrically from the center axis (AX1) of the first pin member 50. More specifically, the center axis AX3 is arranged on one side of the plane PL along the center axis (AX1) of the first pin member 50, and the center axis AX4 of the connecting portion 513 is arranged on the other side of the plane PL. Thus, the load acting on the tip portion 511 of the shaft portion 51 is transferred to the base end portion 512 of the shaft portion 51 via the connecting portion 513 and the second pin member 70p in a well-balanced manner. Note that, in terms of transferring the load acting on the tip portion 511 to the base end portion 512 in a well-balanced manner, it is preferable that the center axis (AX1) of the first pin member 50 be arranged on a line connecting the center axis AX3 of the second pin member 70p and the center axis AX4 of the connecting portion 513.

Next, the mechanism to fix the fixing member 70 (more specifically, the second pin member 70p) to the first pin member 50 will be described.

In the example illustrated in FIG. 3, external threads 70t are formed in the outer circumference surface of the fixing member 70 (more specifically, the second pin member 70p). These external threads 70t are screwed with internal threads 51t formed in the first hole 51h (for example, the tip-side hole 511h or the base-end-side hole 512h) of the shaft portion 51, and thereby the fixing member 70 is fixed to the first pin member 50. Note that, although the fixing member 70 (more specifically, the second pin member 70p) is screwed with and fixed to the first pin member 50 in the example illustrated in FIG. 3, fixing of the fixing member 70 to the first pin member 50 may be performed by other schemes than screwing (for example, welding, brazing, fitting, or the like).

In the example illustrated in FIG. 3, a tip portion 70e of the second pin member 70p reaches the base end portion 512 of the shaft portion 51. Further, in the example illustrated in FIG. 3, the external threads 70t are formed in the tip portion 70e of the second pin member 70p, and these external threads 70t are screwed with the internal threads 51t formed in the base-end-side hole 512h. Alternatively, the tip portion 70e of the second pin member 70p may be located inside the second hole 60h of the reinforcement member 60 without reaching the base end portion 512. In such a case, the external threads 70t formed in the second pin member 70p may be screwed with internal threads 60t provided in the second hole 60h and/or internal threads formed in the tip-side hole 511h.

Note that, when the second pin member 70p is fixed to the first pin member 50 by welding, brazing, fitting, or the like, the external threads 70t or the internal threads (60t, 51t) may be omitted.

Second Embodiment

Figure 5:
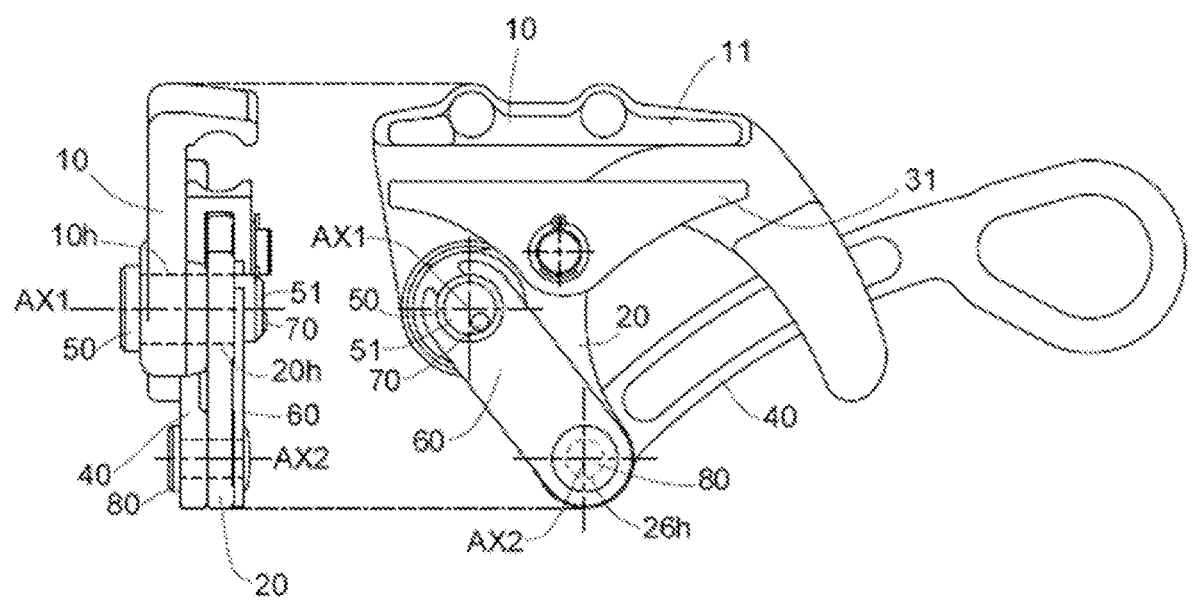
FIG. 5 is a schematic two-side view of a wire gripper in a second embodiment.

A wire gripper 1B in a second embodiment will be described with reference to FIG. 5. FIG. 5 is a schematic two-side view of the wire gripper 1B in the second embodiment. The right side in FIG. 5 illustrates a schematic front view of the wire gripper 1B, and the left side in FIG. 5 illustrates a schematic side view of the wire gripper 1B.

The wire gripper 1B in the second embodiment differs from the wire gripper 1A in the first embodiment in that the reinforcement member 60 is arranged across the first pin member 50 and a third pin member 80 arranged along the second swing axis AX2. Further, in the example illustrated in FIG. 5, in the side view (the left side in FIG. 5), the reinforcement member 60 is arranged on the swing member 20 side out of the wire gripper body 10 and the swing member 20. The wire gripper 1B in the second embodiment is the same as the wire gripper 1A in the first embodiment in other features.

In the second embodiment, features different from those of the first embodiment will be mainly described, and duplicated description for particulars that have already been described in the first embodiment will be omitted. It is therefore obvious that, even though not explicitly described in the second embodiment, the particulars that have already been described in the first embodiment can be employed in the second embodiment.

The wire gripper 1B in the second embodiment has the lever member 40 connected to the swing member 20 in a swingable manner and the third pin member 80 inserted through the swing member 20 and the lever member 40. Further, the reinforcement member 60 is arranged across the first pin member 50 and the third pin member 80. Further, in the example illustrated in FIG. 5, the shaft portion 51 of the first pin member 50 is inserted in the reinforcement member 60, and the shaft portion of the third pin member 80 is inserted in the reinforcement member 60. Note that any mechanism can be employed for the connecting mechanism between the reinforcement member 60 and the third pin member 80. For example, the third pin member 80 may be inserted in the hole of the reinforcement member 60, the tip portion of the third pin member 80 may then be crimped, and thereby the reinforcement member 60 and the third pin member 80 may be connected to each other. Alternatively, the third pin member 80 may be inserted in the hole of the reinforcement member 60, a nut may then be screwed with the tip portion of the third pin member 80, and thereby the reinforcement member 60 and the third pin member 80 may be connected to each other. In such a case, the tip portion of the third pin member 80 is provided with an external-thread portion screwed with the nut. Furthermore, alternatively, the same mechanism as the connecting mechanism between the reinforcement member 60 and the first pin member 50 may be employed for the connecting mechanism between the reinforcement member 60 and the third pin member 80.

The second embodiment provides the same advantageous effect as the first embodiment. Further, in the second embodiment, the reinforcement member 60 is arranged across the first pin member 50 and the third pin member 80. Thus, the reinforcing effect of the reinforcement member 60 of the second embodiment on the swing member 20 is greater than the reinforcing effect of the reinforcement member 60 of the first embodiment on the swing member 20.

[Respective Components of Wire Gripper 1 in Embodiments]

Figure 6:
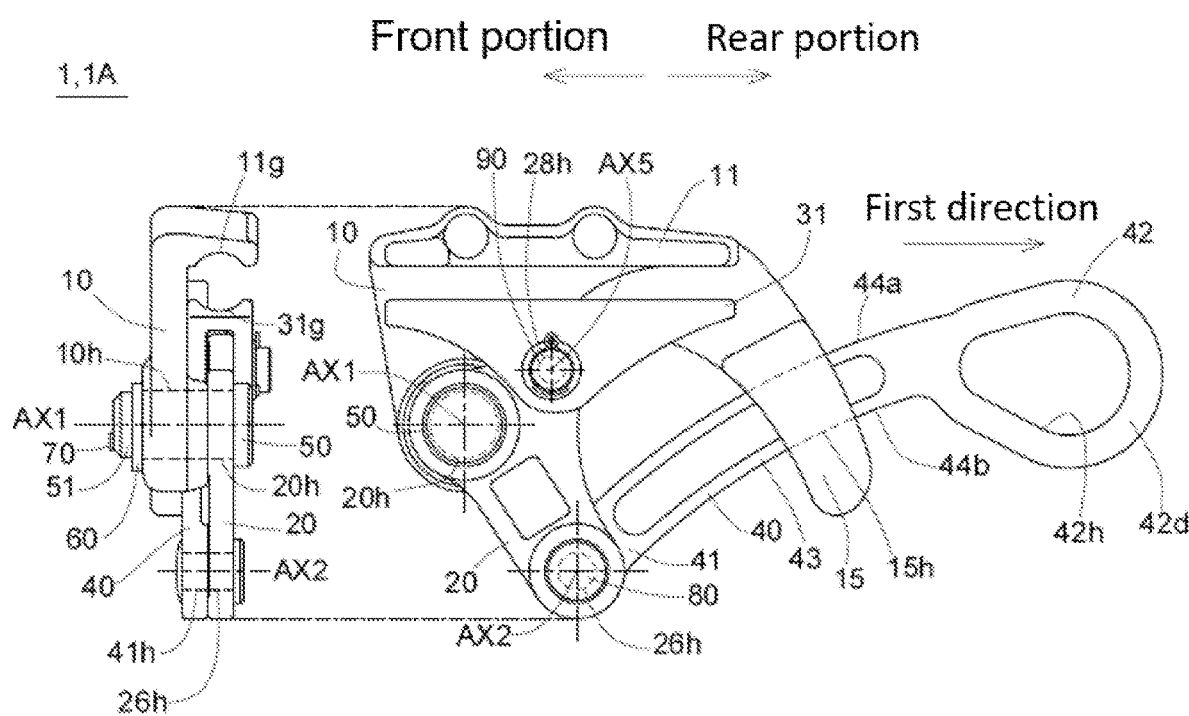
FIG. 6 is a schematic two-side view of the wire gripper in the first embodiment.
Figure 7:
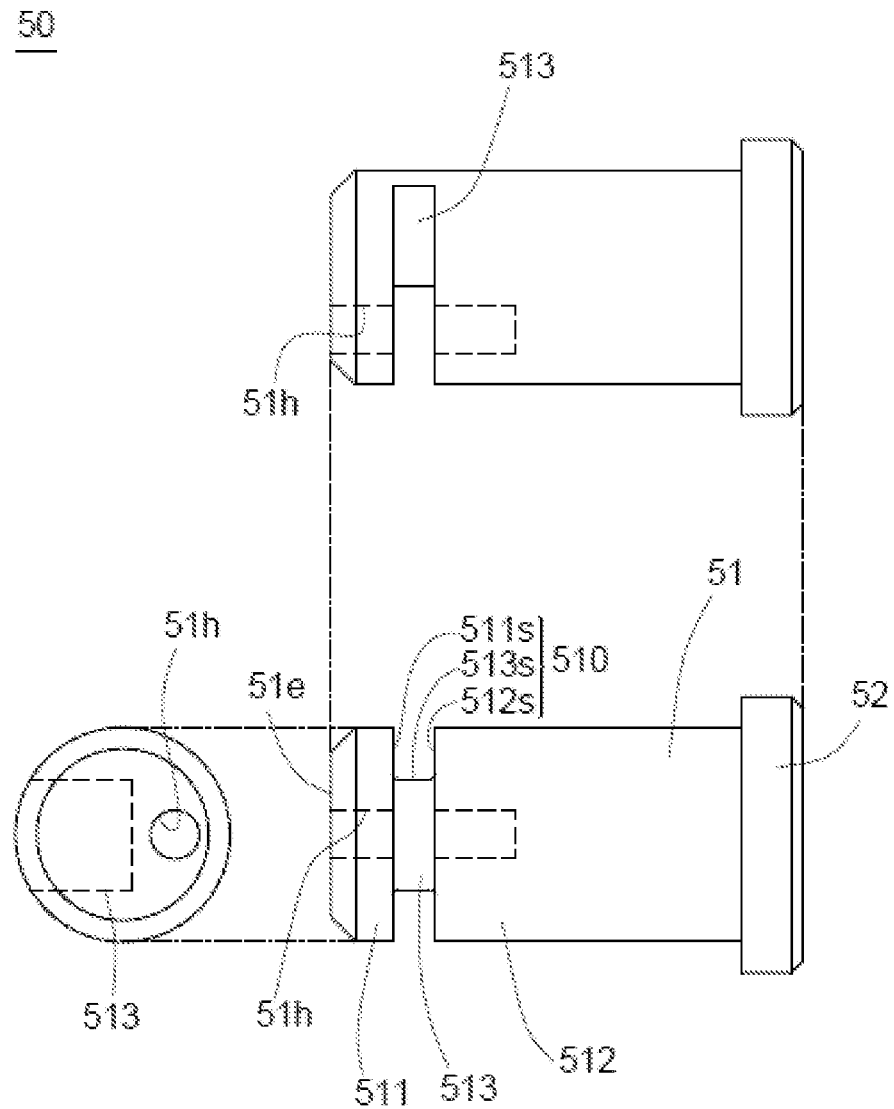
FIG. 7 is a schematic three-side view of the first pin member.
Figure 8:
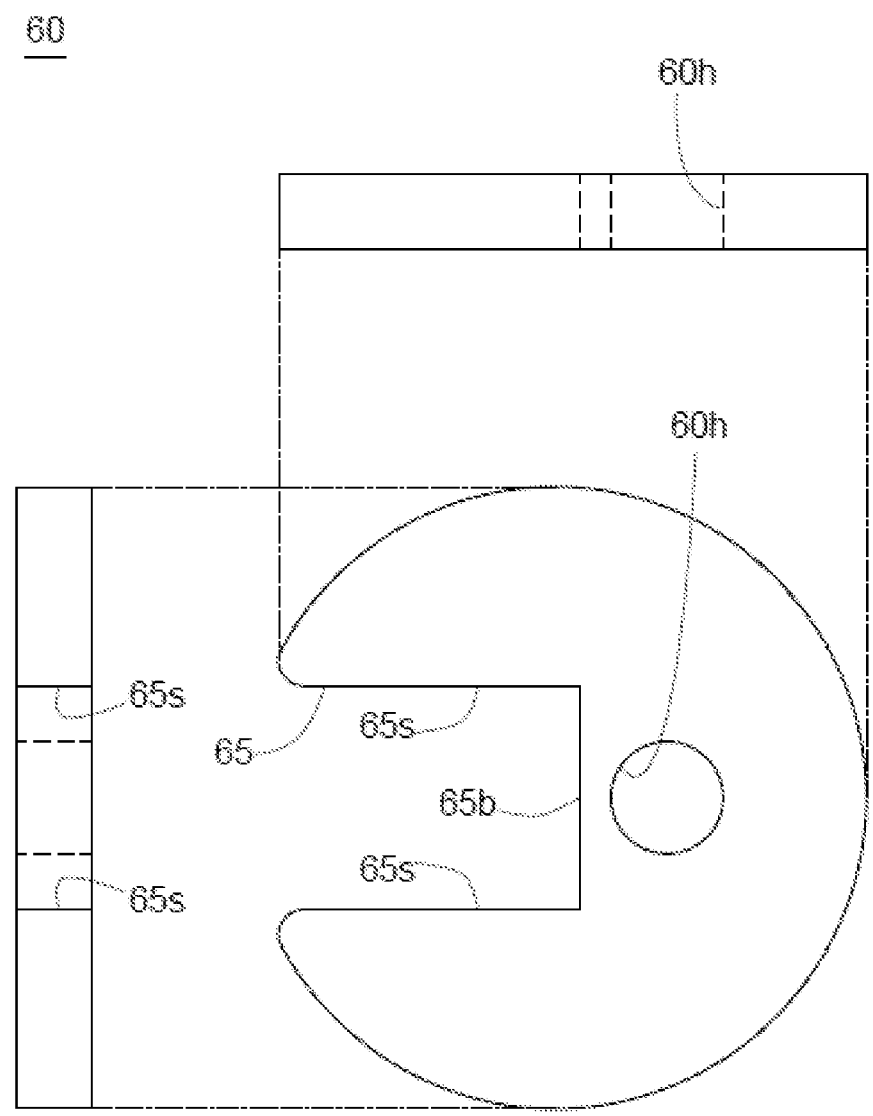
FIG. 8 is a schematic three-side view of a reinforcement member.

An example of respective components of the wire gripper 1 in the first embodiment (or the second embodiment) will be described with reference to FIG. 6 to FIG. 8. FIG. 6 is a schematic two-side view of the wire gripper 1A in the first embodiment. FIG. 7 is a schematic three-side view of the first pin member 50. FIG. 8 is a schematic three-side view of the reinforcement member 60. Note that, in the following description, the direction from the first gripping piece 11 to the second gripping piece 31 is referred to as "lower/downward/below". Further, the direction in which the lever member 40 is pulled so that the gap between the first gripping piece 11 and the second gripping piece 31 decreases is referred to as "rear/rearward" or "first direction".

[Wire Gripper Body 10]

In the example disclosed in FIG. 6, the wire gripper body 10 has the first gripping piece 11 and a lever member guide portion 15. The first gripping piece 11 is a portion that comes into contact with the electric wire W from the above, and the lower part of the first gripping piece 11 is provided with a recess groove 11g used for accepting a part of the electric wire W, for example. The extending direction of the recess groove 11g matches the extending direction of the electric wire W.

The lever member guide portion 15 is provided in a rear part of the wire gripper body 10. In the example illustrated in FIG. 6, the vertical position of the lever member guide portion 15 substantially matches the vertical position of the first swing axis AX1, and the lever member guide portion 15 is arranged on the rear side (first direction side) of the first swing axis AX1. In the example illustrated in FIG. 6, the lever member guide portion 15 extends downward and rearward from the first gripping piece 11.

The lever member guide portion 15 has a guide wall that guides the lever member 40. For example, the guide wall is a wall that defines a through hole 15h through which an intermediate portion 43 of the lever member 40 is inserted. The lever member guide portion 15 restricts the position of the lever member 40, thereby suppresses the lever member 40 from excessively shifting in the horizontal direction (the direction perpendicular to the sheet of FIG. 6), and as a result, suppresses an excessive load from acting on a connecting portion between the lever member 40 and the swing member 20.

The wire gripper body 10 is provided with the first through hole 10h used for inserting the first pin member 50 therethrough that connects the wire gripper body 10 and the swing member 20 in a swingable manner. The first through hole 10h is provided in the lower portion in the front portion (in other words, the portion on the opposite side to the first direction) of the wire gripper body 10, for example.

[Swing Member 20]

The swing member 20 is a plate-like member extending in the direction perpendicular to the first swing axis AX1, for example. The swing member 20 has, for example, a tapered shape whose width decreases from the upper part to the lower part in the front view. More specifically, in the example illustrated in FIG. 6, the swing member 20 has substantially a triangular shape in the front view. Note that the shape of the swing member 20 is not limited to the shape illustrated in FIG. 6. As the shape of the swing member 20, any shape may be employed as long as it can be connected to the wire gripper body 10 in a swingable manner and can be connected to the lever member 40 in a swingable manner.

The swing member 20 is provided with the second through hole 20h used for inserting the first pin member 50 therethrough. For example, the second through hole 20h is provided at the upper end of the front portion (in other words, the portion on the opposite side to the first direction) of the swing member 20. The center axis of the second through hole 20h (in other words, the center axis of the first pin member 50) matches the first swing axis AX1.

The swing member 20 is provided with a third through hole 26h used for inserting the third pin member 80 therethrough. For example, the third through hole 26h is provided at the lower end of the swing member 20. The center axis of the third through hole 26h (in other words, the center axis of the third pin member 80) matches the second swing axis AX2.

In the example illustrated in FIG. 6, the swing member 20 is provided with a fourth through hole 28h used for inserting a fourth pin member 90 therethrough. Note that the fourth pin member 90 is a pin member that connects the swing member 20 and the second gripping piece 31 to each other in a swingable manner. The fourth through hole 28h is provided at the upper end of the rear portion (in other words, the portion on the first direction side) of the swing member 20, for example. The center axis of the fourth through hole 28h (in other words, the center axis of the fourth pin member 90) matches the third swing axis AX5. Note that, in the example illustrated in FIG. 6, the second through hole 20h is arranged at one of the apex portions of substantially the triangular swing member 20, the third through hole 26h is arranged at another apex portion of substantially the triangular swing member 20, and the fourth through hole 28h is arranged at the remaining apex portion of substantially the triangular swing member 20.

[Second Gripping Piece 31]

The second gripping piece 31 is supported by the swing member 20 swingably about the third swing axis AX5. The second gripping piece 31 is a member that comes into contact with the electric wire W from the below, and the upper part of the second gripping piece 31 is provided with a recess groove 31g used for accepting a part of the electric wire W, for example. The extending direction of the recess groove 31g matches the extending direction of the electric wire W. The second gripping piece 31 is arranged below the first gripping piece 11, and the electric wire W is gripped by the first gripping piece 11 from the above and by the second gripping piece 31 from the below.

The second gripping piece 31 is provided with a through hole used for inserting the fourth pin member 90 therethrough.

[Lever Member 40]

The lever member 40 has a first end 41 connected to the swing member 20 in a swingable manner and a second end 42 that is a free end. The lever member 40 is an elongated member extending upward and rearward from the connecting portion to the swing member 20 (in other words, from the second swing axis AX2). In the example illustrated in FIG. 6, the lever member 40 has an arc shape, and a convex surface 44a having the arc shape is located above a concave surface 44b having the arc shape.

The second end 42 of the lever member 40 is provided with a mounting portion 42d used for mounting a pulled member such as a wire material, a bar material, or the like. In the example illustrated in FIG. 6, the mounting portion 42d is a ring portion having a through hole 42h. The first end 41 of the lever member 40 is provided with a through hole (lever member through hole 41h) through which the third pin member 80 is inserted.

[First Pin Member 50]

An example of the first pin member 50 will be described with reference to FIG. 7. The first pin member 50 has the head portion 52 and the shaft portion 51. The outer diameter of the head portion 52 is larger than the outer diameter of the shaft portion 51. The external shape of the head portion 52 may be polygonal (for example, hexagonal, octagonal) or may be circular in a side view (in other words, viewed from a direction along the center axis of the shaft portion 51).

The shaft portion 51 has the tip portion 511, the base end portion 512, and the connecting portion 513. The fitting groove 510 is defined by an outer circumference surface 513s of the connecting portion 513, a base-end-side end surface 511s of the tip portion 511, and a tip-side end surface 512s of the base end portion 512. The fitting groove 510 is a C-shape groove or a ring-shape groove having the connecting portion 513 as the bottom. The reinforcement member 60 is fit into the fitting groove 510. Note that the extending direction of the primary face of the reinforcement member 60 fit into the fitting groove 510 is perpendicular to the extending direction of the first pin member 50.

The tip of the shaft portion 51 is provided with the first hole 51h in a direction from a tip surface 51e to the head portion 52 of the shaft portion 51. The fixing member 70 is inserted in the first hole 51h, and thereby the reinforcement member 60 is fixed to the shaft portion 51 of the first pin member 50 via the fixing member 70.

[Reinforcement Member 60]

An example of the reinforcement member 60 will be described with reference to FIG. 8. The reinforcement member 60 is a plate-like member, for example, and is made of a metal, for example. The thickness of the reinforcement member 60 is around 8 mm (greater than or equal to 0.1 mm and less than or equal to 20 mm).

In the example illustrated in FIG. 8, the external shape of the reinforcement member 60 is a disc shape with the portion of a recess groove 65 being cut off when viewed from a direction perpendicular to the primary face of the reinforcement member 60. However, the external shape of the reinforcement member 60 is not limited to the disc shape with the portion of a recess groove 65 being cut off.

The reinforcement member 60 has a recess groove 65 in which the connecting portion 513 of the first pin member 50 is inserted. The shape of the recess groove 65 is a complementary shape with the shape of the connecting portion 513, for example. In the example illustrated in FIG. 8, the recess groove 65 is defined by a bottom surface 65b and two inner surfaces 65s. Note that, in the example illustrated in FIG. 8, the two inner surfaces 65s are parallel to each other (in order words, the width of the recess groove 65 does not change as it approaches to the bottom surface 65b).

The reinforcement member 60 has a hole (second hole 60h) in which the fixing member 70 is inserted. In the example illustrated in FIG. 8, this hole (second hole 60h) is a through hole extending from the first primary face to the second primary face of the reinforcement member 60. The fixing member 70 is inserted in this hole (second hole 60h), and thereby the reinforcement member 60 is fixed to the shaft portion 51 of the first pin member 50 via the fixing member 70.

It is clear that the present invention is not limited to respective embodiments described above and each of the embodiments can be modified or changed as appropriate within the scope of the technical concept of the present invention. Further, any component used in each embodiment can be combined with another embodiment, and any component can be omitted in each embodiment.

For example, in each of the embodiments, the reinforcement member 60 may be arranged on the wire gripper body 10 side out of the wire gripper body 10 and the swing member 20 or may be arranged on the swing member 20 side.

INDUSTRIAL APPLICABILITY

With the use of the wire gripper and the attachment structure for attaching a swing member to a first member of an operation tool of the present invention, even when a load acting on the swing member is relatively high, the wire gripper and the attachment structure are not damaged. Therefore, the present invention is useful for business entities that use an operation tool such as a wire gripper to perform their operations and manufacturers that manufacture operation tools such as wire grippers.

LIST OF REFERENCES 1, 1A, 1B wire gripper
10 wire gripper body
10h first through hole
11 first gripping piece
11g recess groove
15 lever member guide portion
15h through hole
20 swing member
20h second through hole
26h third through hole
28h fourth through hole
31 second gripping piece
31g recess groove
40 lever member
41 first end
41h lever member through hole
42 second end
42d mounting portion
42h through hole
43 intermediate portion
44a convex surface
44b concave surface
50 first pin member
51 shaft portion
51e tip surface
51h first hole
51s outer circumference surface
51t internal threads
52 head portion
60 reinforcement member
60h second hole
60t internal threads
61 insertion portion
62 retaining portion
65 recess groove
65b bottom surface
65s inner surface
70 fixing member
70e tip portion
70p second pin member
70t external threads
80 third pin member
90 fourth pin member
90h fourth through hole
510 fitting groove
511 tip portion
511h tip-side hole
511s base-end-side end surface
512 base end portion
512h base-end-side hole
512s tip-side end surface
513 connecting portion
513s outer circumference surface
AX1 first swing axis
AX2 second swing axis
AX3 center axis
AX4 center axis
AX5 third swing axis
W electric wire

The invention claimed is:

1. An attachment structure for attaching a swing member to a first member of an operation tool, the attachment structure comprising:
   the first member having a first through hole;
   the swing member having a second through hole;
   a first pin member having a shaft portion inserted through the first through hole and the second through hole;
   a reinforcement member that prevents the first member and the swing member from coming out of the first pin member and supports at least a part of a bending load or a torsional load received by the swing member; and
   a fixing member that fixes the reinforcement member to the first pin member,
   wherein a fitting groove is provided in an outer circumference surface of the shaft portion of the first pin member,
   wherein the reinforcement member comprises an insertion portion inserted in the fitting groove and a retaining portion protruding out of the fitting groove, and
   wherein the fixing member fixes the reinforcement member to the first pin member with the reinforcement member being fit into the first pin member;
   wherein the fixing member is a second pin member,
   wherein a first hole in which a part of the second pin member is inserted is formed in the shaft portion, and
   wherein a second hole in which another part of the second pin member is inserted is formed in the reinforcement member.

2. The attachment structure according to claim 1,
   wherein the shaft portion comprises
   a tip portion arranged on a tip side of the fitting groove,
   a base end portion arranged on a base end side of the fitting groove, and
   a connecting portion that connects the tip portion and the base end portion,
   wherein the second pin member is arranged across the tip portion and the base end portion.

3. The attachment structure according to claim 2, wherein the tip portion of the shaft portion and the base end portion of the shaft portion are connected to each other by the connecting portion and the second pin member.

4. The attachment structure according to claim 3,
   wherein the center axis of the second pin member is arranged on one side of a plane along the center axis of the first pin member, and
   wherein the center axis of the connecting portion is arranged on the other side of the plane.

5. The attachment structure according to claim 4, further comprising:
   a lever member connected to the swing member in a swingable manner; and
   a third pin member inserted through the swing member and the lever member,
   wherein the reinforcement member is arranged across the first pin member and the third pin member.

6. A wire gripper comprising the attachment structure according to claim 4.

7. A wire gripper comprising the attachment structure according to claim 5.

8. The attachment structure according to claim 3, further comprising:
   a lever member connected to the swing member in a swingable manner; and a third pin member inserted through the swing member and the lever member, wherein the reinforcement member is arranged across the first pin member and the third pin member.

9. A wire gripper comprising the attachment structure according to claim 8.

10. A wire gripper comprising the attachment structure according to claim 3.

11. The attachment structure according to claim 2, further comprising:

a lever member connected to the swing member in a swingable manner; and a third pin member inserted through the swing member and the lever member, wherein the reinforcement member is arranged across the first pin member and the third pin member.

12. A wire gripper comprising the attachment structure according to claim 11.

13. A wire gripper comprising the attachment structure according to claim 2.

14. A wire gripper comprising the attachment structure according to claim 1.

15. The attachment structure according to claim 5, further comprising:

a lever member connected to the swing member in a swingable manner; and a third pin member inserted through the swing member and the lever member, wherein the reinforcement member is arranged across the first pin member and the third pin member.

16. A wire gripper comprising the attachment structure according to claim 15.

17. An attachment structure for attaching a swing member to a first member of an operation tool, the attachment structure comprising:

the first member having a first through hole;

the swing member having a second through hole;

a first pin member having a shaft portion inserted through the first through hole and the second through hole;

a reinforcement member that prevents the first member and the swing member from coming out of the first pin member and supports at least a part of a bending load or a torsional load received by the swing member; and a fixing member that fixes the reinforcement member to the first pin member, wherein a fitting groove is provided in an outer circumference surface of the shaft portion of the first pin member, wherein the reinforcement member comprises an insertion portion inserted in the fitting groove and a retaining portion protruding out of the fitting groove, and wherein the fixing member fixes the reinforcement member to the first pin member with the reinforcement member being fit into the first pin member, wherein the attachment structure further comprises:

a lever member connected to the swing member in a swingable manner; and a third pin member inserted through the swing member and the lever member, wherein the reinforcement member is arranged across the first pin member and the third pin member.

18. A wire gripper comprising the attachment structure according to claim 17.

* * * * *